(12) United States Patent
Ladégourdie et al.

(10) Patent No.: US 9,238,264 B2
(45) Date of Patent: Jan. 19, 2016

(54) COLD-BOX BINDING AGENT SYSTEMS AND MIXTURES FOR USE AS ADDITIVES FOR SUCH BINDING AGENT SYSTEMS

(71) Applicant: Hüttenes-Albertus Chemische Werke GmbH, Düsseldorf (DE)

(72) Inventors: Gérard Ladégourdie, Düsseldorf (DE); Markus Dörschel, Köln (DE); Ursula Wichmann, Neuss (DE); Amine Serghini Anbari, Neukirchen-Vluyn (DE); David Strunk, Neuss (DE)

(73) Assignee: HUTTENES-ALBERTUS CHEMISCHE WERKE GMBH, Dusseldorf (DE)

(*) Notice: Subject to any disclaimer, the term of this patent is extended or adjusted under 35 U.S.C. 154(b) by 0 days.

(21) Appl. No.: 13/763,150

(22) Filed: Feb. 8, 2013

(65) Prior Publication Data

US 2013/0225718 A1  Aug. 29, 2013

Related U.S. Application Data

(63) Continuation of application No. PCT/EP2012/072705, filed on Nov. 15, 2012.

(60) Provisional application No. 61/603,660, filed on Feb. 27, 2012.

(30) Foreign Application Priority Data

Feb. 9, 2012 (DE) .......................... 10 2012 201 971

(51) Int. Cl.
| | |
|---|---|
| *B22C 1/00* | (2006.01) |
| *C08K 5/42* | (2006.01) |
| *C08K 5/51* | (2006.01) |
| *C08K 5/54* | (2006.01) |
| *B22C 1/22* | (2006.01) |
| *B22C 1/16* | (2006.01) |
| *B22C 9/02* | (2006.01) |
| *B22C 9/10* | (2006.01) |
| *C08G 18/54* | (2006.01) |
| *C08G 18/76* | (2006.01) |
| *B22C 1/20* | (2006.01) |

(52) U.S. Cl.
CPC ............... *B22C 1/2273* (2013.01); *B22C 1/162* (2013.01); *B22C 1/205* (2013.01); *B22C 9/02* (2013.01); *B22C 9/10* (2013.01); *C08G 18/542* (2013.01); *C08G 18/7671* (2013.01); *C08K 5/42* (2013.01); *C08K 5/51* (2013.01); *C08K 5/54* (2013.01)

(58) Field of Classification Search
CPC ........ B22C 1/00; B22C 1/2273; B22C 1/162; B22C 9/02; B22C 9/10
USPC ............................................................ 523/139
See application file for complete search history.

(56) References Cited

U.S. PATENT DOCUMENTS

| | | | |
|---|---|---|---|
| 4,558,074 A | 12/1985 | Torbus | |
| 5,616,631 A * | 4/1997 | Kiuchi et al. | 523/139 |
| 6,465,542 B1 * | 10/2002 | Torbus et al. | 523/143 |
| 6,720,072 B1 | 4/2004 | Hinterwaldner | |
| 2009/0093567 A1 | 4/2009 | Oniyanagi et al. | |
| 2011/0073269 A1 * | 3/2011 | Frohn et al. | 164/23 |

FOREIGN PATENT DOCUMENTS

| | | |
|---|---|---|
| CN | 1993194 | 7/2007 |
| CN | 102665960 | 9/2012 |
| DE | 36 39 233 A1 | 5/1988 |
| EP | 0 182 809 B1 | 3/1991 |
| WO | WO 2009141158 A1 * | 11/2009 |
| WO | 2011/115258 | 9/2011 |

OTHER PUBLICATIONS

ASM International Handbook Committee (2008; 2010). ASM Handbook, vol. 15—Casting. pp. 528-548. ASM International. Online version available at: http://www.knovel.com/web/portal/browse/display?_EXT_KNOVEL_DISPLAY_bookid=3133&VerticalID=0.*

* cited by examiner

*Primary Examiner* — Nicole M Buie-Hatcher
*Assistant Examiner* — Chelsea M Christensen
(74) *Attorney, Agent, or Firm* — Duane Morris LLP; Gregory M. Lefkowitz

(57) ABSTRACT

A description is provided of a mixture which is preparable by allowing the reaction of a premixture of (av), methanesulfonic acid (bv), one or more esters of one or more phosphorous-oxygen acids and (cv) one or more silanes. The invention also concerns the use of said mixtures as additives for the polyisocyanate component of a two-component binding agent system for preparation of a polyurethane resin. The invention further concerns a solution containing polyisocyanate for use as a component of a molding material binding agent system, and the use of a solution containing polyisocyanate as the polyisocyanate component of a two-component binding agent system for preparation of a polyurethane resin and corresponding two-component binding agent systems for preparation of a polyurethane resin.

21 Claims, No Drawings

COLD-BOX BINDING AGENT SYSTEMS AND MIXTURES FOR USE AS ADDITIVES FOR SUCH BINDING AGENT SYSTEMS

CROSS-REFERENCE TO RELATED APPLICATIONS

This application claims priority to German Patent Application No. DE 10 2012 201 971.5, filed Feb. 9, 2012, and U.S. Provisional Application No. 61/603,660, filed Feb. 27, 2012, and is a continuation of International Application No. PCT/EP2012/072705, filed Nov. 15, 2012, the entireties of which are incorporated herein by reference.

The invention concerns a mixture that is preparable by allowing a premixture of (av) methanesulfonic acid, (bv) one or more esters of one or more phosphorous-oxygen acids and (cv) one or more silanes to react. The invention also concerns the use of said mixtures as an additive for the polyisocyanate component of a two-component binding agent system for preparation of a polyurethane resin. The invention further concerns a solution containing polyisocyanate for use as a component of a molding material binding agent system, and the use of a solution containing polyisocyanate as a polyisocyanate component of a two-component binding agent system for preparation of a polyurethane resin and corresponding two-component binding agent systems for preparation of a polyurethane resin. The invention also concerns the use of a solution containing polyisocyanate, and a two-component binding agent system for the production of foundry sand cores or molds according to the cold-box method and/or for preparation of a polyurethane resin in particular using the polyurethane cold-box method and mixtures for production of a foundry core or mold and foundry cores or molds. The invention also concerns a method for production of a foundry core or mold.

In the production of foundry sand cores and molds the polyurethane-forming cold-hardening binding agent systems are of great importance. These binding agent systems consist of two components, a polyol (normally dissolved in a solvent) with at least two OH-groups in the molecule and a polyisocyanate (usually likewise dissolved in a solvent) with at least two isocyanate groups in the molecule. The two components are usually mixed with a molding matrix, in particular sand, and the components react in the mixture to form a cured polyurethane binding agent, typically in the presence of catalysts, which guarantee a rapid reaction and thus a sufficiently short curing time. In addition to other substances such as metal-organic compounds, in the main tertiary amines are considered as catalysts which after molding of the mixture comprising the molding matrix are introduced into the molding tool with a carrier gas.

The polyol component is normally a condensation product of (optionally) substituted phenols with aldehydes (hereinafter referred to as "phenolic resin") dissolved in a solvent, having a low-to average-degree of condensation and a large number of free OH-groups in the molecule. In certain cases, especially with sand cores for low casting temperatures, the polyol component can also be a solution of an oligomeric, dimeric or monomeric phenol body, e.g. of a terphenol, bisphenol or dihydroxybenzol. For at these polyols a large number of (generally polar) solvents are available. The solutions are normally set at a concentration of 40-95 wt % of the polyol component and can contain usual additives.

Polyisocyanates with at least two isocyanate groups in the molecule are considered for use in the polyisocyanate component. Preference is for aromatic polyisocyanates, of which diphenylmethane-4,4'-diisocyanate (MDI), 2,2',6,6'-tetramethyldiphenylmethane-4,4'-diisocyanate, diphenyldimethylmethane-4,4'-diisocyanate and diphenyl-4,4'-diisocyanate are typical examples. Further suitable polyisocyanates are for example disclosed in EP 1057554 A2. The polyisocyanates can form the polyisocyanate component either in pure form or dissolved in a solvent, e.g. a mixture of aromatic hydrocarbons with a boiling point range of above 150° C. or a fatty acid methyl ester-containing solvent or a or a tetraalkyl silicate-containing solvent. In the case of a solution the concentration of the polyisocyanate is generally above 60 wt %.

For the preparation of a mixture for production of a foundry core or mold a molding matrix, in particular a grainy molding sand such a quartz sand, chromite sand, divine sand, or zircon sand, is mixed with the two binding agent components, wherein the proportions of the two components can be approximately in the region of 0.5-1.5 parts by weight of polyisocyanate component to 1 part by weight of polyol component and in particular are dimensioned such that an almost stoichiometric ratio of the isocyanate groups to the OH-groups results. Such a mixture is then processed to form the foundry sand cores or molds, e.g. in that it is filled or shot into a molding tool, possibly compressed and then cured by a short period of gassing with a highly volatile tertiary amine such as triethyl-, dimethylethyl-, dimethyl-n-propyl- or dimethylisopropylamine. The sand cores or molds can then be removed from the molding tool.

In the course of gassing the sand cores or molds with already achieve a measurable strength ("initial strength"), which upon completion of the gassing increases further to reach the final strength value. In foundry practice the highest possible initial strength is desirable here, in order that the sand cores or molds as far as possible can be removed from the molding tool immediately after gassing and the tool is available for another work cycle.

Sufficiently high initial strengths can be achieved with rapid-hardening binding agent systems. However, the high reactivity of the system necessary for this has the result that the period for which the mixture of the two binding agent components and the molding matrix can be stored before being further processed into sand cores or molds (the so-called "benchlife"), is significantly shortened. This is a serious disadvantage, for there is a practical requirement for sufficient benchlives, so that a prepared charge of a molding material mixture (molding sand mixture) does not become prematurely unusable. Above all due to the warm external temperatures which arise for example in temperate climates in the summer or in tropical or sub-tropical countries all year-round, an extension or adjustment of the benchlife represents a major challenge, since higher temperatures favor the reactivity of the binding agent system. Good benchlives are provided by less strongly reactive binding agent systems, but these in turn result in poorer initial strengths.

In order to be able to meet the dual requirements of the highest possible initial strength and the best possible benchlife, up until now acid chlorides such as phosphoryl chloride, phthaloyl chloride or chlorosilanes, have been added to the polyisocyanate component of the binding agent. DE-A-34 05 180 describes such a molding material binding agent system containing chlorosilanes.

Binding agent systems containing acid chlorides are known from U.S. Pat. No. 4,540,724.

A proportion of chlorine in the binding agent system can, however, lead to disadvantages and health risks in the processing of the binding agent systems and in the subsequent metal casting, since upon decomposition of the binding agent system chlorine-containing compounds can result which are a health hazard. For example, phosphoryl chloride decomposes in the presence of water with the formation of highly corrosive fog containing phosphorous and hydrochloric acid. If the phosphoryl chloride in vapor form is inhaled, then decomposition takes place with the water present in the lungs and this can lead to serious damage to heath and to acidosis.

Apart from the health risks from using chlorine-containing binding agent systems, the use of chlorine-containing binding agent systems also often leads to corrosion of the cast parts manufactured (especially in gray cast iron), triggered by the chlorine-containing decomposition products of the binding agent system. A further disadvantage of the use of chlorine-containing binding agent system is that sand cores or molds that have already been used can often only be re-employed as used sand after costly reprocessing during which the chlorine-containing chemicals harmful to health have to be removed. Thus there is a need for a substitute for acid chlorides or chlorosilanes, which can extend the benchlife of a molding material and which is at the same time chlorine-free. The substitute should be capable of fully or partially replacing the acid chlorides or chlorosilanes used to date, without adversely affecting the benchlife or the strength of the sand cores (initial strength and final strength).

Apart from the high demands in terms of the benchlife and the starting and final strengths of the sand cores or molds, foundry engineering also places high demands on the storage stability of the sand cores or molds produced. In foundry practice the sand cores or molds produced are temporarily stored before being used in the casting process. Here the sand cores or molds are exposed to the normal environmental conditions of a foundry, namely high temperatures and humidity. Above all blackened sand cores or molds usually have quite a high water content. A back reaction or decomposition reaction of the polyurethane resins taking place in moisture leads to a deterioration in quality of the sand cores or molds produced. In the worst case scenario this can lead to the sand cores or molds produced becoming unusable after long idle time.

In order to increase the storage stability of the sand cores or molds, adhesion agents are often added to the binding agent system, so that especially the strength conditions are significantly improved. The adhesion agents used are normally silanes. Suitable silanes are for example amino silanes, epoxy silanes, mercapto silanes and ureido silanes. However, silanes are relatively expensive and play a significant part in the overall costs of the binding agent system. So there is a need to find a suitable way to reduce the quantities of silanes used, but without this diminishing the storage stability of the sand cores or molds.

Because of the increasing complexity of cast parts the avoidance of surface defects on the cast part is becoming ever-more important, too. Because the core geometries are becoming increasingly intricate and the molds ever-more complex, there has been a corresponding increase in the demands on the molding materials and especially binding agent systems.

Due to the thermal expansion of the sand contained in the molding material as a result of the heat of the casting process molds and cores can rupture, so that the molten metal permeates the mold or core. The resultant surface defects, such as veining, can only be removed with great difficulty.

During the pyrolysis of resin-bonded molding materials due to the heat of the casting process gases are released. These can also lead to casting defects. In this connection a number of different causes can be identified leading to these casting defects which are referred to as gas defects.

On the one hand gas defects as described by H. G. Levelink, F. P. M. A. Julian and H. C. J. de Man in Gießerei 67 (1980) 109, can for example be caused by "exogenous" gases. These "exogenous" gases are mainly the result of the pyrolysis of organic binding agents upon contact with the molten metal in the mold or the core. These gases generate a gas pressure in the mold or core which, if it exceeds the metallostatic counter-pressure, can lead to gas defects in the cast part, mostly in the upper region of this. These gas bubbles generally have a smooth inner surface.

A further type of gas defects is described for example by Gy. Nandori and J. Pal. Miskoloc and K. Peukert in Gießerei 83 (1996) 16. It is a case here of the occurrence of gas bubbles which are usually associated with slag. The causes of such gas-slag defects are considered to be "exogenous", e.g. resulting from the mold/core and mold cavity, and "endogenous" e.g. gas from the molten metal. These gases react in part with the molten metal, resulting in oxide-rich slag. This slag, together with the remaining gases, forms gas defects.

At points where the surface of a core or a mold is inadequately protected against the ingress of molten metal, penetrations also frequently occur. The corresponding defects must be removed from the cast part at great effort.

Thus there is a constant need for binding agent systems having a high thermal stability and which thus contribute to reducing surface defects on the cast part.

The object of the invention was thus especially to find a suitable additive for polyurethane-forming cold-hardening binding agent systems, which solves some or all of the above-mentioned problems, in doing so, especially a sufficiently high benchlife should be guaranteed, without significantly adversely affecting the strength of the sand cores and molds (initial and final strength). In addition, the thermal stability of the binding agent system should be improved and the cast surface of the cast part produced thereby optimized. In addition, the moisture or coating slurry resistance should be improved or at least maintained compared with the state of the art.

DE 2921726 discloses special emulsions containing water, and organic polyisocyanate, optionally a non-ionic, surface-active medium as an emulsifier and a sulfonic acid. Here the sulfonic acid is a sulfonic acid of general formula R—$(SO_3H)_n$, in which n denotes an integer 1 or 2 and R an aromatic hydrocarbon radical with 6-14 carbon atoms, an aliphatic hydrocarbon radical with 10-18 carbon atoms, a cycloaliphatic hydrocarbon radical with 6-15 carbon atoms, an araliphatic hydrocarbon radical with 7-15 carbon atoms or an alkaromatic hydrocarbon radical with 7-24 carbon atoms.

DE 2921698 A1 discloses a self-releasing, essentially anhydrous, polyisocyanate-based binding agent for the production of molded forms consisting of A) a polyisocyanate and B) sulfonic acid of general formula R—$(SO_3H)_n$, in which n denotes an integer 1 or 2 and R an aromatic hydrocarbon radical with 6-14 carbon atoms, an aliphatic hydrocarbon radical with 10-18 carbon atoms, a cycloaliphatic hydrocarbon radical with 6-15 carbon atoms, an araliphatic hydrocarbon radical with 7-15 carbon atoms or an alkaromatic hydrocarbon radical with 7-24 carbon atoms, wherein the equivalent ratio of components A) and B) is between 100:0.5 and 100:20.

JP 03-041116 concerns certain polyurethane resin compositions for orthopedic cast strips comprising a polyurethane prepolymer comprising a polyol and a polyisocyanate, a catalyst, a stabilizer (e.g. acid chlorides such as benzoyl chloride or sulfonic acids such methanesulfonic acid) and an ester compound polyethylene glycol.

DE 4215873 describes the use of esters that are liquid at ambient temperature as a solvent for isocyanates and/or isocyanurates, whereby the viscosity of the isocyanates and/or isocyanurates can be drastically reduced.

DE 19542752 describes the use of vegetable oil methyl ester, in particular of rapeseed oil methyl ester, as a solvent for individual or both components of foundry molding material binding agents with a polyurethane basis, the components of which comprise a phenolic resin containing free OH-groups and a polyisocyanate as the reaction partner.

JP 53-128526 discloses that for the preparation of a self-curing mold mixture, a phenolic resin containing 0.05-40% carboxylic and/or sulfonic acid and sand is mixed with a polyisocyanate in the presence of a basic catalyst.

JP 62-104648 discloses that for the preparation of a sand mold, foundry sand is kneaded with a binding agent comprising a furan resin, toluenesulfonic acid, tetraethylsilicate, methyl diisocyanate, silicon dioxide and boric acid.

CN 102049463 discloses a method comprising the mixing of a sodium alkyl sulfinate solution with a phenolic resin, and then mixing with sand, further mixing with a polyisocyanate-ester, and the molding of a casting mold.

DE 3639223A1 discloses a cold-hardening molding material binding agent for the production of resin-bonded moldings, wherein the binding agent comprises an aldehyde-reactive substance and an acetal as reaction partners and a strong acid as catalyst.

EP 0182809 B1 discloses a binding agent composition prepared by reacting a resin component with a hardener component in the presence of a phosphorous compound, wherein the resin component comprises a phenolic resin comprising reactions products of an aldehyde with a phenol at both ortho positions or at one ortho position and the pare position, and the hardener component comprises a liquid polyisocayanate with at least two isocyanate groups. The resin component is prepared separately, before it is mixed and reacted with the hardener component in the presence of the phosphorous compound. The binding agent composition can be hardened at room temperature with an amine catalyst. The phosphorous compound is a phosphorous-based acid having at least one free hydroxyl group at the phosphorous atom, and is present in a quantity which extends the processing time of the binding agent composition in the absence of the amine catalyst.

Individual or all the above-mentioned objects are met by a mixture preparable by allowing the reaction of a premixture of
(av) 1.0-50.0 wt % methanesulfonic acid;
(bv) one or more esters of one or more phosphorous-oxygen acids, wherein the total quantity of said esters is in the range 5.0-90.0 wt %,
and
(cv) one or more silanes, selected from the group consisting of amino silanes, epoxy silanes, mercapto silanes, hydroxy silanes and ureido silanes, wherein the total quantity of said silanes is in the range 5.0-90.0 wt %.
wherein the proportion of water is a maximum of 0.1 wt %,
wherein the wt % information relates to the total quantity of ingredients (av), (bv) and (cv) in the premixture The abovementioned premixture is a mixture comprising or consisting of
(a) 1.0-50.0 wt % of methanesulfonic add;
(b) one or more esters of one or more phosphorous-oxygen adds, wherein the total quantity of said esters is in the range 5.0-90.0 wt %,
and
(c) one or more silanes, selected from the group consisting of amino silanes, epoxy silanes, mercapto silanes, hydroxy silanes and ureido silanes, wherein the total quantity of said silanes is in the range 5.0-90.0 wt %,
wherein the proportion of water is a maximum of 0.1 wt %,
wherein the wt % information relates to the total quantity of ingredients (a), (b) and (c) in the mixture.

The water content of the premixture corresponds to the total water contents of the individually used components.

As esters of a phosphorous-oxygen acid in particular use is made of esters of phosphinic acid, phosphonic acid, phosphoric acid, peroxophosphoric acid, hypodiphosphonic acid, diphosphonic acid, hypodiphosphoric acid, diphosphoric acid and peroxodiphosphoric acid. Particular preference is for esters of a phosphorous-oxygen acid selected from the group consisting of the esters of phosphoric acid. Particularly preferred esters are mono- and diesters of the phosphoric acids, especially dibutyl phosphate and dodecyl phosphate.

Particularly preferred silanes are selected from the group consisting of amino silanes, epoxy silanes and ureido silane. A particularly preferred silane is bis(trimethylsilylpropyl)amine.

Further suitable silanes are for example gamma-hydroxypropyltrimethoxysilane, gamma-aminopropyl-methyl-diethoxysilane, gamma-aminopropyltrimethoxysilane, gamma-aminopropyltrimethoxysilane, 3-ureidopropyltriethoxysilane, gamma-mercaptopropyitrimethoxysilane, gamma-glycidoxypropyitrimethoxysilane, beta-(3,4-epoxycyclohexyl)trimethoxysilane and N-beta-(aminoethyl)-gamma-aminopropyitrimethoxysilane.

Gamma-aminopropylmethyldiethoxysilane (N-aminopropylmethyldiethoxysilane) goes by the commercial designations silane A-1100, sane A-1101 and silane A-1102 (technical duality) and AMEO T and gamma-aminopropyltriethoxysilane (N-aminopropyltrimethoxysilane) by the names Dynasilan 1505 and 1506 (technical quality). Also suitable are silanes which can be obtained under the commercial designations DAMO, DAMO-T and Dynesilan 1411.

It is understood that ingredients (a), (b) and (c) can in each case be provided or prepared separately. Ingredients (a), (b) and (c) (in particular in the proportions indicated as preferred) can be mixed together one after another or simultaneously. In individual cases the separate ingredients can react fully or incompletely with one another in such a way that the resulting mixture does not comprise the ingredients (a), (b) and (c) or not in the proportions according to the invention. In many cases initially a premixture with ingredients (av), (bv) and (cv) is prepared, wherein the proportions indicated above correspond to the proportions in which the ingredients (av), (bv) and (cv) are mixed together one after another or simultaneously and thereby the premixture is obtained, whereby any reaction is not taken into account in determining the wt % details. Here the premixture corresponds to the notional product in which the possible reaction of the ingredients has not yet started. After subsequently allowing the premixture prepared to react, the mixture according to the invention results.

According to the invention it was found that the mixture according to the invention can be used as an additive in binding agent systems for extending the benchlife of a molding material and in so doing especially the chlorosilanes and acid chlorides that are normally used for this purpose can be partially or completely replaced. Apart from an extension of the benchlife an improvement in storage stability was also noted.

Further aspects and especially further objects of the invention are provided by the attached claims and the following description.

According to the invention preference is for a mixture in which the total quantity of methanesulfonic acid in the mixture or premixture is in the range 3.0-40.0 wt %, particularly preferably in the range 5.5-35.0 wt %, with regard to the total quantities of ingredients (a), (b) and (c) in the mixture or ingredients (av), (bv) and (cv) in the premixture and/or the total quantity of the one or more esters of one or more phosphorous-oxygen acids in the mixture or premixture is in the range 10.0-80.0 wt %, particularly preferably in the range 15.0-70.0 wt %, with regard to the total quantity of ingredients (a), (b) and (c) in the mixture or of ingredients (av), (bv) and (cv) in the premixture and/or the total quantity of the one or more silanes in the mixture or premixture is in the range 10.0-85.0 wt %, particularly preferably in the range 15.0-80.0 wt %, with regard to the total quantity of ingredients (a), (b) and (c) in the mixture or of ingredients (av), (bv) and (cv) in the premixture.

Particular preference is for a mixture according to the invention, in which the total quantity of methanesulfonic acid in the mixture or premixture is in the range 5.5-35.0 wt %, the total quantity of the one or more esters of one or more phosphorous-oxygen acids in the mixture or premixture is in the range 15.0-70.0 wt % and simultaneously the total quantity of the one or more silanes in the mixture or premixture is in the range 15.0-80.0 wt %, in each case with regard to the total quantity of ingredients (a), (b) and (c) in the mixture or of ingredients (av), (bv) and (cv) in the premixture.

Apart from ingredients (a), (b), (c) in the mixture or ingredients (av), (bv) and (cv) in the premixture further components may be present in the mixture. Thus for example it can be useful to adjust the viscosity of the mixture by addition of solvents or to add other additives.

A mixture according to the invention is also particularly preferably configured for many applications such that the total quantity of ingredients (a), (b), (c) in the mixture or ingredients (av), (bv) and (cv) in the premixture is 90 wt % or more, in particular 95 wt % or more, with regard to the total quantity of mixture or premixture. For other applications the proportion is significantly lower, to this see information given hereinbelow.

Our own investigations have shown that apart from the proportions indicated the mass ratios of the individual ingredients also have an effect on the properties of the mixture according to the invention.

Advantageously a mixture according to the invention is configured such that the mass ratio of ingredient (a) to ingredient (b) in the mixture or the mass ratio of ingredient (av) to ingredient (bv) in the premixture is in the range 0.05-1.4, in particular in the range 0.1-1.3, particularly preferably in the range 0.13-125 and/or (in particular "and")

the mass ratio of ingredient (a) to ingredient (c) in the mixture or the mass ratio of ingredient (av) to ingredient (cv) in the premixture is in the range 0.03-1.6, in particular in the range 0.05-1.5, particularly preferably in the range 0.07-1.45 and/or (in particular "and")

the mass ratio of ingredient (b) to ingredient (c) in the mixture or the mass ratio of ingredient (bv) to ingredient (cv) in the premixture is in the range 0.1-4.0, in particular in the range 0.15-3.5, particularly preferably in the range 0.18-3.35.

Mixtures particularly preferred according to the invention are configured such that the or at least one of the ester(s) is of a phosphorous-oxygen acid, wherein the total quantity of said esters in the mixture or premixture is in the range 5.0-90.0 wt %, preferably in the range 10.0-80.0 wt %, particularly preferably in the range 15.0-70.0 wt % and/or the or at least one of the silanes is selected from the group consisting of amino silanes, epoxy silanes, mercapto silanes and ureido silanes, wherein the total quantity of said silanes in the mixture or premixture is in the range 5.0-90.0 wt %, preferably in the range 10.0-85.0 wt %, particularly preferably in the range 15.0-80.0 wt %, wherein the wt % information in each case relates to the total quantity of ingredients (a), (b) and (c) in the mixture or (av), (bv) and (cv) in the premixture.

In practice it is advantageous if the mixture according to the invention comprises one or more solvents. Inter alia this allows the viscosity of the mixture to be adjusted as a later dosing of the mixture is in this way simplified. Ingredients (a), (b) and (c) and ingredients (av), (bv) and (cv) are not counted as solvents for the purposes of this text.

Particular preference is for a mixture according to the invention, comprising on or more solvents selected from the group consisting of aromatic hydrocarbons, especially mixtures of aromatic hydrocarbons with a boiling point range of above 150° C. at normal pressure (e.g. "Solvesso 100", "Solvesso 150");

fatty acid alkyl esters, in particular rapeseed oil methyl ester;

diesters of dicarboxylic acids, in particular dibasic ester (a mixture of dimethyl esters of $C_4$-$C_6$ dicarboxylic acids referred to as "DBE");

propylene carbonate;

alkyl silicates, e.g. TEOS, alkyl silicate oligomers and mixtures of these (e.g. mixtures of various alkyl silicates, mixtures of various oligomers and mixtures of alkyl silicate(s) and oligomer(s));

wherein the total quantity of said solvents in the mixture in certain preferred configurations is in the range 0-80 wt %, preferably in the range 10-50 wt %, with regard to the total quantity of the mixture.

Suitable solvents for the mixture according to the invention (as defined above) and independently of the respective concentrations are tetraalkyl silicates such as tetraethyl silicate (TEOS), aromatic hydrocarbons (such as for example substituted alkyl benzenes, xylols and naphthalines) and mixtures thereof, fatty acid alkyl esters (in particular rapeseed oil methyl ester) and mixtures thereof, mixtures of the various solvent types and mixtures of these with alkylene carbonates such as propylene carbonate or dialkyl esters of aliphatic dicarboxylic acids, in particular dimethyl esters of adipinic acid, glutaric acid and/or succinic acid. The latter dialkyl esters are for example sold under the designation DBE (Dibasic Ester).

A further aspect of the present invention concerns the use of a mixture according to the invention (as defined above, in particular as designated above as preferred) as an additive for the polyisocyanate component and/or polyol component of a two-component binding agent system for preparation of a polyurethane resin, in particular for the polyisocyanate component of a two-component binding agent system for preparation of a polyurethane resin for application in the polyurethane cold-box method.

The additive can be combined in any order with the polyisocyanate component and the polyol component; combining with the polyisocyanate component and the polyol component can take place in the presence of the molding matrix. The additive can especially be combined in a first step with the polyisocyanate component, wherein a solution containing polyisocyanate according to the invention forms. Alternatively the additive can be combined in a first step with the polyol component. As a further alternative the additive can be added in the form of an additional component in a first step to the molding matrix or a mixture, which already contains the molding matrix and possibly the polyisocyanate component and/or polyol component.

Our own research has shown that the use of the mixture according to the invention as an additive for the polyisocyanate component of a two-component binding agent system for preparation of a polyurethane resin, leads to exceptionally advantageous properties. Foundry sand cores and molds produced using such a polyisocyanate component demonstrate exceptionally good storage stability and cast products made using the sand cores and molds produced have surprisingly few casting defects. The molding material mixtures prepared with such a polyisocyanate component have a very long benchlife, but without the initial and final strength of the sand cores and molds made from this being impaired.

A further aspect of the present invention concerns a solution containing polyisocyanate for use as a component of a molding material binding agent system, preparable by mixing
(I) one or more polyisocyanates with in each case two or more isocyanate groups in the molecule, wherein in particular the one polyisocyanate or at least one of the more polyisocyanates is a methylene diphenyl diisocyanate or an oligomer or polymer thereof,
or
a premixture containing polyisocyanate comprising one or more polyisocyanates with in each case two or more isocyanate groups in the molecule, wherein in particular the one polyisocyanate or at least one of the more polyisocyanates is a methylene diphenyl diisocyanate or an oligomer or polymer thereof,
with
(II) a total quantity of 0.1-10.0 wt %, in particular 0.1-5.0 wt %, particularly preferably 0.2-2.0 wt % of a mixture according to the invention,
wherein the wt % information relates to the total quantity of solution containing polyisocyanate.

A solution containing polyisocyanate comprising or consisting of
(I) one or more polyisocyanates with in each case two or more isocyanate groups in the molecule, wherein in particular the one polyisocyanate or at least one of the more polyisocyanates is a methylene diphenyl diisocyanate or an oligomer or polymer thereof
and
(II) the ingredients
  (a) 0.001-5.000 wt % methanesulfonic acid;
  (b) one or more esters of one or more phosphorous-oxygen acids, wherein the total quantity of said esters is in the range 0.005-9.0 wt %,
  and
  (c) one or more silanes, selected from the group consisting of amino silanes, epoxy silanes, mercapto silanes, hydroxy silanes and ureido silanes, wherein the total quantity of said silanes is in the range 0.005-9.0 wt %,
wherein the wt % information relates to the total quantity of solution containing polyisocyanate, is obtainable by mixing said ingredients. Such a solution is also suitable for use as a component of a molding material binding agent system.

According to the invention preference is for a solution containing polyisocyanate, in which the total quantity of methanesulfonic acid in the solution containing polyisocyanate is in the range 0.003-4.000 wt %, particularly preferably in the range 0.0055-3.500 wt %, with regard to the total quantity of solution containing polyisocyanate
and/or
the total quantity of the one or more esters of one or more phosphorous-oxygen acids in the solution containing polyisocyanate is in the range 0.01-8.0 wt %, particularly preferably in the range 0.015-7.0 wt %, with regard to the total quantity of solution containing polyisocyanate
and/or
the total quantity of the one or more silanes in the solution containing polyisocyanate is in the range 0.01-8.5 wt %, particularly preferably in the range 0.015-8.0 wt %, with regard to the total quantity of solution containing polyisocyanate.

Especially preferred is a solution containing polyisocyanate according to the invention, in which the total quantity of methanesulfonic acid is in the range 0.0055-3,500 wt %, the total quantity of the one or more esters of one or more phosphorous-oxygen acids is in the range 0.015-7.0 wt % and the total quantity of the one or more silanes is simultaneously in the range 0.015-8.0 wt %, in each case with regard to the total quantity of solution containing polyisocyanate.

Particular preference is for a solution containing polyisocyanate according to the invention, comprising one or more solvents selected from the group consisting of
aromatic hydrocarbons, especially mixtures of aromatic hydrocarbons with a boiling point range of above 150° C. at normal pressure (e.g. "Solvesso 100", "Solvesso 150");
fatty acid alkyl esters in particular rapeseed oil methyl ester;
diesters of dicarboxylic acids, in particular dibasic esters (a mixture of dimethyl esters of $C_4$-$C_6$ dicarboxylic acids referred to as "DBE");
propylene carbonate;
alkyl silicates, e.g. TEOS, alkyl silicate oligomers and mixtures thereof (e.g. mixtures of various alkyl silicates, mixtures of various oligomers and mixtures of alkyl silicate(s) and oligomer(s));
  wherein the total quantity of said solvent is in particular in the range 44.9-1 wt %, with regard to the total quantity of solution containing polyisocyanate, Especially preferred is a solution containing polyisocyanate according to the invention, comprising one or more solvents selected from the group of tetraalkyl silicates, wherein the total quantity of tetraalkyl silicates is in the range 44.9-1 wt %, with regard to the total quantity of solution containing polyisocyanate.

Also particularly preferred is a solution containing polyisocyanate according to the invention, comprising tetraethyl-ortho silicate, wherein the total quantity of tetraethyl-ortho silicate is in the range 44.9-1, with regard to the total quantity of solution containing polyisocyanate.

Preference is for a solution containing polyisocyanate according to the invention, comprising a total quantity of polyisocyanate in the range 55-95 wt %, with regard to the total mass of the solution containing polyisocyanate.

Here according to the invention it is preferred that the solution containing polyisocyanate defined above comprises
acid chlorides (such as phosphoryl chloride) in a maximum total quantity of 500 ppm (0.05 wt %)
and/or
chlorosilanes in a maximum total quantity of 500 ppm (0.05 wt %)
and/or
hydrofluoric acid in a maximum quantity of 500 ppm 0.05 wt %)

and/or polyols in a maximum quantity of 500 ppm (0.05 wt %)

and/or phenolic resins and furan resins in a maximum total quantity of 500 ppm (0.05 wt %), in each case with regard to the total quantity of solution containing polyisocyanate.

In practice hydrofluoric acid has in the past frequently been used in order to improve the moisture resistance of the foundry sand cores or molds produced, but because of its high toxicity it constitutes a serious potential danger. As a result of the invention its use is now unnecessary.

Our own investigations have shown that the solution containing polyisocyanate according to the invention, even in the absence of phosphoryl chloride and/or hydrofluoric acid, has exceptionally good properties (high storage stability and long benchlives). At the same time the properties that are harmful to health, resulting from the phosphoryl chloride and hydrofluoric acid, are eliminated. In addition, castings that are produced using a solution containing polyisocyanate according to the invention have surprisingly low corrosion (especially when gray cast iron is used).

According to a further related aspect the invention concerns the use of a solution containing polyisocyanate according to the invention (as defined above, in particular where described as preferred) as a polyisocyanate component of two-component binding agent system for preparation of a polyurethane resin, in particular as a polyisocyanate component of a two-component binding agent system for preparation of a polyurethane resin using the polyurethane cold-box method.

According to a further related aspect the invention concerns a two-component binding agent system for preparation of a polyurethane resin for casting, consisting of a solution containing polyisocyanate according to the invention (as defined above, in particular where described as preferred as the polyisocyanate component, and separately a polyol component, wherein the polyol component in particular comprises phenol-formaldehyde resin with two or more methylol groups per molecule, particularly preferably a benzyl ether resin with ortho-ortho-structures.

Preferred benzyl ether resins ortho-ortho-structures are for example disclosed in EP 1057554 A2.

The invention also concerns the use of a solution containing polyisocyanate according to the invention as defined above or of a two-component binding agent system according to the invention as defined above for the production of foundry sand cores or molds according to the cold-box method and/or for preparation of a polyurethane resin in particular using the polyurethane cold-box method.

The invention further concerns a mixture for production of a foundry core or mold, comprising a molding matrix and either the components of a two-component binding agent system according to the invention or polyisocyanate component and a polyol component of a two-component binding agent system and a mixture according to the invention.

Further objects of the present invention are a mold or a core for casting, comprising a molding matrix, in particular a foundry sand, and either the hardened binding agent system resulting from the hardening of a two-component binding agent system according to the invention (as defined above, in particular where described as preferred)

or producible by molding a mixture comprising a molding matrix, in particular a foundry sand, and the components of a two-component binding agent system according to the invention (as defined above, in particular where described as preferred) and hardening of the binding agent system in the molded mixture to form a hardened binding agent system, and a method for production of a foundry core or mold, in particular according to the polyurethane cold-box method, with the following steps:

mixing of a molding matrix, in particular a foundry sand, with the components of a two-component binding agent system according to the invention, (as defined above, in particular where described as preferred);

molding of the resultant mixture comprising molding matrix and the components of the binding agent system;

bringing the resultant molded mixture into contact with a gaseous catalyst, in particular (especially in the context of the cold-box method) with a gaseous amine, so that the binding agent system hardens and binds the molding matrix.

Preferably the foundry sand cores or molds are produced according to the cold-box method. In foundries the cold-box method is one of the most important polyurethane gassing methods. The designation is that used by the VDG and has also been introduced into the German casting industry to designate this method. In this connection reference can be made for example to U.S. Pat. No. 3,409,579. In the cold-box method an amine gassing agent such as for example triethyl-, dimethylethyl-, dimethyl-n-propyl- or dimethylisopropylamine is used as an acceleration catalyst, which considerably speeds up the addition of polyisocyanates to a phenolic resin, e.g. benzylether resin. In this process a polyurethane is formed. Resins used in the cold-box method are as a rule anhydrous here, since water would react prematurely with the polyisocyanate.

The process normally involves shooting of the foundry sand (core sand) comprising the foundry sand binding agent system according to the invention into a core box. Then gassing is performed using an amine-air or amine-nitrogen mixture in gas or aerosol form. The amines involved are generally triethyl-, dimethylethyl-, dimethyl-n-propyl- or dimethylisopropylamine, which are in each case blown into the core boxes at a pressure of 2-6 bar. The residual gases are normally driven out of the core with heated scavenging air, nitrogen or $CO_2$ gas and can be disposed of in an add scrubber, charged with diluted sulfuric add or phosphoric add.

In the process, depending on the amine, the binding agent system according to the invention hardens at temperatures of in particular 20-100° C., particularly preferably 45-80° C. With the cold-box method especially the hardening normally takes place at the ambient temperature of the foundry, that is to say generally at a temperature in the range 15-50° C., especially at a temperature in the range 15-40° C. Therefore the binding agent is designated as a cold-hardening binding agent for foundry sand.

The cold-box method has extensive applications, especially in metal casting, for example in engine castings.

When the mixture according to the invention or the solution containing polyisocyanate according to the invention is used the molding matrixes/foundry sands are substantially free of chlorine following casting, so that corrosion of the castings (especially with gray cast iron) is avoided and the previously used sand cores or molds can be re-employed as used sand. For this purpose the used sand is thermally and/or mechanically treated. Both of these treatment methods result in insignificant or no loading with chemicals that are damaging to health. This re-employment of previously used sand cores or treatment of used sand is even possible with systems containing bentonite or basic systems.

The following examples shall explain the invention without restricting it. Where "PW" is used in the examples, this stands for parts by weight (parts by mass).

EXAMPLE 1

Preparation of a Mixture According to the Invention M1

In a reaction vessel equipped with stirrer, cooling and a thermometer, the following substances were dosed in the order shown, wherein the temperature was kept at below 35° C.:
25.84 PW dibutyl phosphate
6.46 PW methanesulfonic acid
37.70 PW bis(trimethylsilylpropyl)amine
30.00 PW tetraethylsilicate
The product is a mixture according to the invention.

EXAMPLE 1a

Preparation of Mixture According to the Invention M2

In a reaction vessel equipped with stirrer, cooling and a thermometer, the following substances were dosed in the order shown, wherein the temperature was kept at below 35° C.:
25.84 PW dibutyl phosphate
6.46 PW methanesulfonic acid
37.70 PW bis(trimethylsilylpropyl)amine
5.00 PW tetraethyl silicate
The product is a mixture according to the invention.

EXAMPLE 1b

Preparation of a Mixture According to the Invention M3

In a reaction vessel equipped with stirrer, cooling and a thermometer, the following substances were dosed in the order shown, wherein the temperature was kept at below 35° C.:
25.84 PW dibutyl phosphate
6.46 PW methanesulfonic acid
37.70 PW bis(trimethylsilylpropyl)amine
The product is a mixture according to the invention.

EXAMPLE 2

Preparation of a Preferred Phenolic Resin of the Benzyl Ether Type (Precondensate)

In a reaction vessel equipped with cooling, a thermometer and a stirrer:

467.1 PW phenol
213.6 PW paraformaldehyde (as the formaldehyde source) and
0.2 PW zinc acetate
14.2 PW methanol
were placed. The cooler was set to reflux. The temperature was increased continuously for one hour to 110° C. and then maintained at this level, until a refractive index ($n_D^{20}$) of 1.547 was reached (two to three hours).

Then the cooler was switched to atmospheric distillation and the temperature increased within an hour to 125-126 C., so that the volatile components were distilled off from the product solution, until a refractive index ($n_D^{20}$) of the product of approximately 1.595 was reached.

Vacuum distillation then followed, to a refractive index ($n_D^{20}$) of 1.617, during which the remaining volatile components were removed.

EXAMPLE 3

Preparation of a Cold-Box Phenolic Resin Solution H1

From the phenolic resin (precondensate) according to Example 2, once the desired value of the refractive index had been reached, a resin solution H1 for the cold-box method was prepared, which had the composition indicated below:

Phenolic resin solution H1

| | |
|---|---|
| 53.5 PW | phenolic resin (precondensate) according to Example 2 |
| 29.5 PW | tetraethyl silicate |
| 16.0 PW | DBE (Dibasic Ester) |
| 1.0 PW | epoxy silane |

The phenolic resin solution H1 prepared is considered to be the polyol component of a two-component binding agent system according to the invention (see Example 4a).

EXAMPLE 4

Preparation of Solutions Containing Polyisocyanates A1 (not According to the Invention) and A2 (According to the Invention) for the Cold-Box Method Solution containing polyisocyanate not according to the invention A1:
The components indicated below were mixed together with constant blending one after another, so that the solution containing polyisocyanate A1 resulted:

| | |
|---|---|
| 80.0 PW | diphenylmethane diisocyanate |
| 10.0 PW | tetraethyl silicate |
| 10.0 PW | dioctyl adipate |
| 0.4 PW | acid chloride |
| 0.5 PW | bis(trimethoxysilylpropyl)amine |

Solution containing polyisocyanate according to the invention A2:
The components indicated below were mixed together with constant blending one after another, so that the solution containing polyisocyanate according to the invention A2 resulted:

| | |
|---|---|
| 80.0 PW | diphenylmethane diisocyanate |
| 10.0 PW | tetraethyl silicate |
| 10.0 PW | dioctyl adipate |
| 1.33 PW | mixture M1 (according to Example 1) |

The prepared solution A2 containing polyisocyanate according to the invention corresponds to a polyisocyanate component in a two-component binding agent system according to the invention (see Examples 4a and 5).

EXAMPLE 4a

Preparation of a Two-Component Binding Agent System According to the Invention

A two-component binding agent system according to the invention is prepared by providing a phenolic resin solution H1 (polyol component) according to Example 3 and separately from this a solution containing polyisocyanate according to the invention A2 (polyisocyanate component).

EXAMPLE 5

Preparation of Cold-Box Test Specimens and Core Testing

Using the abovementioned phenolic resin solution and solution containing polyisocyanate (see Examples 3 and 4), the mixtures shown in Table 1 below were prepared for production of a core or a mold, in which respectively

| | |
|---|---|
| 100 PW | quartz sand H32, |
| 0.7 PW | of the respective phenolic resin solution (Example 3; H1) and |
| 0.7 PW | of the respective solution containing polyisocyanate (Example 4; A1 = not according to the invention, A2 = according to the invention) were mixed in a vibratory mixer. |

The mixing time was in each case 60 seconds. With the mixtures obtained, test specimens (+GF+ bar) were shot at a shooting pressure of 4 bar, which were than gassed for 10 seconds at a gassing pressure of 4 bar with dimethylisopropylamine and then flushed with air for 10 seconds. The quantity of sand for each mixture for preparation of a core or a mold was 4 kg, the sand temperature and the ambient temperature were approximately 20° C., and the relative humidity (RH) was approximately 30%. Then the flexural strengths of the cold-box test specimens obtained in this way were determined according to the GF method.

In the preparation of the cold-box test specimens and the testing of the flexural strengths the specifications of VDG leaflet P 73 of February 1996 were applied.

Table 1 firstly provides a comparison of the strength values of a core according to the invention and a conventional core (in $N/cm^2$).

For the results compiled in Table 1 investigations were first performed with a mixture used to prepare a cold-box test specimen immediately after mixing ("IMMEDIATE" column) and secondly with a mixture first stored for an hour after mixing (for assessing the so-called "benchlife" BL) and then used to prepare a cold-box test specimen ("BL 1 h" column). Corresponding investigations were also performed after 3 hours' storage of the mixture for production of a core or a mold at ambient temperature ("BL 3 h RT" column) and at a storage temperature of 40° C. ("BL 3 h 40° C." column). Determination of the flexural strengths of each cold-box test specimen took place immediately after gassing.

Table 1 also provides in the columns denoted by the letters B, D, F results of the moisture resistance of the test specimens (cores) according to the invention. For this three different series of tests were performed:

| | |
|---|---|
| Series B: | Test specimens immediately after preparation, immersed in water slurry, air dried, tested after 1 hour ("B1 h"). |
| Series D: | Test specimens immediately after preparation, immersed in water slurry, dried in the oven for 1 hour at 150° C. ("D hot"), tested hot. |
| Series F: | Test specimens stored at in excess of 95% relative humidity for 1 day ("F 1 d"), then tested. |

TABLE 1

| | | Flexural strengths | | | | | | |
|---|---|---|---|---|---|---|---|---|
| Processing of mixture | | | | | | | | |
| Phenolic resin solutions | Solution containing polyisocyanate | Immediate | BL 1 h | BL 3 h RT | BL 3 h 40° C. | B 1 h | D Hot | F 1 d |
| H 1 | A 1 | 264 | 230 | 221 | 168 | 315 | 305 | 388 |
| H 1 | A 2 | 265 | 255 | 241 | 241 | 282 | 277 | 403 |

EXAMPLE 6

Synergy Effect of the Active Substance Combination

Various solutions containing polyisocyanates A3-A6 (similar to Example 4) were prepared, having the compositions indicated in the following:

Solution containing polyisocyanate not according to the invention A3 (base mix)

| | |
|---|---|
| 80.0 PW | diphenylmethane diisocyanate |
| 10.0 PW | tetraethyl silicate |
| 10.0 PW | dioctyl adipate |

Solution containing polyisocyanate not according to the invention A4 (with methanesulfonic acid)

| | |
|---|---|
| 80.0 PW | diphenylmethane diisocyanate |
| 10.0 PW | tetraethyl silicate |
| 10.0 PW | dioctyl adipate |
| 0.1 PW | methanesulfonic acid |

Solution containing polyisocyanate not according to the invention A5 (with dibutyl phosphate)

| 80.0 PW | diphenylmethane diisocyanate |
|---|---|
| 10.0 PW | tetraethyl silicate |
| 10.0 PW | dioctyl adipate |
| 0.4 PW | dibutyl phosphate |

Solution containing polyisocyanate not according to the invention A6 (with bis(trimethylsilylpropyl)amine)

| 80.0 PW | diphenylmethane diisocyanate |
|---|---|
| 10.0 PW | tetraethyl silicate |
| 10.0 PW | dioctyl adipate |
| 0.5 PW | bis(trimethoxysilylpropyl)amine |

The solutions containing polyisocyanates A3-A6 prepared were used similarly to Example 5 for the preparation of cold-box test specimens. The phenolic resin solution H1 according to Example 3 served as the phenolic resin solutions.

The flexural strengths of the cold-box test specimens produced (determined as in Example 5) are summarized in Table 2. For comparison, the values determined in Example 5 for a cold-box test specimen produced according to the invention (based on polyol component H1 and polyisocyanate component A2) are also included in Table 2.

TABLE 2

Processing of the mixture for preparation of a core or a mold

| Phenolic resin solution | Solution containing polyisocyanate | Immediate | BL 1 h | BL 3 h RT | BL 3 h 40° C. | B 1 h | D hot | F 1 d |
|---|---|---|---|---|---|---|---|---|
| H 1 | A 3 | 241 | 194 | 135 | NB* | 94 | 165 | 263 |
| H 1 | A 4 | 229 | 209 | 180 | 94 | 91 | 171 | 239 |
| H 1 | A 5 | 220 | 197 | 194 | 186 | 99 | 186 | 249 |
| H 1 | A 6 | 235 | 191 | 124 | NB* | 88 | 180 | 241 |
| H 1 | A 2 | 265 | 255 | 241 | 241 | 282 | 277 | 403 |

*Could not be determined, foundry sand mixture hardened off

It can be seen that both the flexural strengths in the context of the investigation of the initial strength and benchlife and the flexural strengths in the context of the investigation of the moisture resistance (B, D, F strengths) are higher for the mixture according to the invention (H1, A2) than for the comparative mixtures (H, A4-6).

EXAMPLE 7

Elimination of Hydrofluoric Acid

From the phenolic resin (precondensate) according to Example 2 once the desired value of the refractive index had been reached, resin solutions were prepared having the compositions indicated in the following:

Phenolic resin solution H3

| 54.45 PW | phenolic resin (precondensate) |
|---|---|
| 23.65 PW | DBE (Dibasic Ester) |
| 21.5 PW | rapeseed oil methyl ester |
| 0.3 PW | amidosilane |
| 0.1 PW | hydrofluoric acid |

Phenolic resin solution H4

| 54.45 PW | phenolic resin (precondensate) |
|---|---|
| 23.65 PW | DBE (Dibasic Ester) |
| 21.5 PW | rapeseed oil methyl ester |

Phenolic resin solution H5

| 50.84 PW | phenolic resin (precondensate) |
|---|---|
| 17.1 PW | DBE (Dibasic Ester) |
| 13.0 PW | rapeseed oil methyl ester |
| 18.6 PW | Solvesso 100 (mixture of aromatic hydrocarbons, (AS 64742-95-6)) |
| 0.31 PW | amidosilane |
| 0.15 PW | hydrofluoric acid |

Phenolic resin solution H6

| 50.84 PW | phenolic resin (precondensate) |
|---|---|
| 17.1 PW | DBE (Dibasic Ester) |
| 13.0 PW | rapeseed oil methyl ester |
| 18.6 PW | Solvesso 100 |

Then a conventional solution and a solution containing polyisocyanate according to the invention were prepared having the compositions indicated in the following:

Solution containing polyisocyanate not according to the invention A7

| 85.0 PW | diphenylmethane diisocyanate |
|---|---|
| 14.8 PW | rapeseed oil methyl ester |
| 0.2 PW | phosphorous oxychloride |

Solution according to the invention containing polyisocyanate A8

| 85.0 PW | diphenylmethane diisocyanate |
|---|---|
| 14.8 PW | rapeseed oil methyl ester |
| 0.8 PW | mixture M1 |

Solution containing polyisocyanate not according to the invention A9

| 84.7 PW | diphenylmethane diisocyanate |
|---|---|
| 13.0 PW | Solvesso 150 |
| 2.0 PW | rapeseed oil methyl ester |
| 0.3 PW | Phosphorous oxychloride |

Solution containing polyisocyanate according to the invention A10

| 84.7 PW | diphenylmethane diisocyanate |
|---|---|
| 13.0 PW | Solvesso 150 |
| 2.0 PW | rapeseed oil methyl ester |
| 0.8 PW | mixture M1 |

With the solutions prepared, similarly to Example 5, mixtures for production of a core or a mold and cold-box test specimens were prepared and their properties investigated.

The results for flexural strength of the cold-box test specimens not according to the invention and those according to the (see Example 5) are summarized in Table 3:

TABLE 3

| Processing of the mixtures for preparation of a core or a mold | | | | | | | |
|---|---|---|---|---|---|---|---|
| Phenolic resin solution | Solution containing polyisocyanate | Immediate | BL 1 h | BL 3 h RT | B 1 h | D hot | F 1 d |
| H 3 | A 7 | 194 | 206 | 155 | 278 | 274 | 327 |
| H 4 | A 8 | 199 | 220 | 167 | 273 | 276 | 330 |
| H 5 | A 9 | 194 | 226 | 153 | 295 | 264 | 314 |
| H 6 | A 10 | 188 | 215 | 215 | 285 | 273 | 339 |

The results show that with phosphorous oxychloride and hydrofluoric acid two very toxic substances in the mixture for preparation of a core or a mold can be eliminated without the properties of the cold-box test specimens produced being impaired.

EXAMPLE 8

Preparation of a Mixture for Production of a Core or a Mold for the Cold-Box Method with Varying Addition of the Mixture According to the Invention M1 to the Components of the Mixture for Preparation of a Core or a Mold For the determination of the flexural strengths of a test specimen according to the invention for use in the cold-box method the mixture M1 according to Example 1 within a series of measurements was added only to the phenolic resin solution or the solution containing polyisocyanate or the mixture for preparation of a core or a mold, having the composition indicated in the following:

Phenolic resin solution H7

| 54.0 PW | phenolic resin (precondensate) |
|---|---|
| 29.8 PW | tetraethyl silicate |
| 16.2 PW | DBE (Dibasic Ester) |
| 2.0 PW | mixture M1 |

Phenolic resin solution H8

| 54.0 PW | phenolic resin (precondensate) |
|---|---|
| 29.8 PW | tetraethyl silicate |
| 16.2 PW | DBE (Dibasic Ester) |

Polyisocyanate solution according to the invention A11

| 80.0 PW | diphenylmethane diisocyanate |
|---|---|
| 10.0 PW | tetraethyl silicate |
| 10.0 PW | dioctyl adipate |
| 2.0 PW | mixture M1 |

Mixtures according to the invention for preparation of a core or a mold F1-F3

Mixture according to the invention for preparation of a core or a mold F1

| 100 PW | foundry sand H32 |
|---|---|
| 0.7 PW | phenolic resin solution H8 |
| 0.7 PW | polyisocyanate solution A11 (contains mixture M1) |

Mixture for preparation of a core or a mold F2

| 100 PW | foundry sand H32 |
|---|---|
| 0.7 PW | phenolic resin solution H7 (contains mixture M1) |
| 0.7 PW | polyisocyanate solution A3 |

Mixture for preparation of a core or a mold F3

| 100 PW | foundry sand H32 |
|---|---|
| 0.014 PW | mixture M1 (according to the invention; according to Example 1) |
| 0.7 PW | phenolic resin solution H8 |
| 0.7 PW | polyisocyanate solution A3 |

TABLE 4

| Processing of the mixture for preparation of a core or a mold Mixture for preparation of a core or a mold | Immediate | BL 1 h | BL 3 h RT | BL 3 h 40° C. | B 1 h | D hot | F 1 d |
|---|---|---|---|---|---|---|---|
| F 1 | 247 | 226 | 195 | 191 | 297 | 283 | 374 |
| F 2 | 226 | 207 | 187 | 156 | 258 | 241 | 283 |
| F 3 | 168 | 197 | 206 | NB* | 270 | 266 | 321 |

*Could not be determined, foundry sand mixture hardened off

It can be seen that the mixture F1 (addition of the mixture M1 in the solution containing polyisocyanate (A11)) allows particularly high flexural strengths.

EXAMPLE 9

Use of a Tri-Amino-Functional Silane

In the preparation of the mixture according to the invention M4 (see also Example 1) a tri-amino-functional silane was also used as an added ingredient.

Mixture M4 according to the invention

| | |
|---|---|
| 17.0 PW | tetraethyl silicate |
| 24.0 PW | dibutyl phosphate |
| 6.0 PW | methanesulfonic acid |
| 10.0 PW | tri-amino-functional silane |

Composition of the polyisocyanate solutions:

Solution containing polyisocyanate according to the invention A12

| | |
|---|---|
| 78.9 PW | diphenylmethane diisocyanate |
| 9.86 PW | tetraethyl silicate |
| 9.86 PW | dioctyl adipate |
| 1.4 PW | mixture M1 |

Solution containing polyisocyanate according to the invention A13

| | |
|---|---|
| 89.4 PW | diphenylmethane diisocyanate |
| 9.92 PW | tetraethyl silicate |
| 9.92 PW | dioctyl adipate |
| 0.86 PW | mixture M4 |

With the solutions prepared, similarly to Example 5, mixtures for producing a core or a mold and cold-box test specimens were prepared and accordingly investigated for theft properties.

The results for the flexural strength of the conventional cold-box test specimens and those according to the invention (see Example 5) are summarized in Table 5:

TABLE 5

| Processing of the mixture for preparation of a core or a mold | | | | | | | |
|---|---|---|---|---|---|---|---|
| Phenolic resin solution | Solution containing polyisocyanate | Immediate | BL 1 h | BL 3 h RT | B 1 h | D hot | F 1 d |
| H 1 | A 12 | 253 | 285 | 236 | 286 | 294 | 389 |
| H 1 | A 13 | 247 | 259 | 201 | 162 | 250 | 394 |

It can be seen that the molds or cores produced according to the invention have similar flexural strengths.

EXAMPLE 10

Preparation of the Mixture Using Dodecyl Phosphate

Mixture according to the invention M5

| | |
|---|---|
| 14.0 PW | tetraethyl silicate |
| 20.0 PW | dodecyl phosphate |
| 3.0 PW | methanesulfonic acid |
| 17.5 PW | amino silane |

Solution containing polyisocyanate according to the invention A14

| | |
|---|---|
| 80 PW | diphenylmethane diisocyanate |
| 10 PW | tetraethyl silicate |
| 10 PW | dioctyl adipate |
| 1.4 PW | mixture M1 |

Solution containing polyisocyanate according to the invention A15 (with dodecyl phosphate)

| | |
|---|---|
| 80 PW | diphenylmethane diisocyanate |
| 10 PW | tetraethyl silicate |
| 10 PW | dioctyl adipate |
| 1.64 PW | mixture M5 |

With the solutions prepared, similarly to Example 5, mixtures for producing a core or a mold and cold-box test specimens were prepared and accordingly investigated for their properties.

The results for the flexural strength of the conventional cold-box test specimens and those according to the invention (see Example 5) are summarized in Table 6:

TABLE 6

| Processing of the mixture for preparation of a core or a mold | | | | | | | |
|---|---|---|---|---|---|---|---|
| Phenolic resin solution | Solution containing polyisocyanate | Immediate | BL 1 h | BL 3 h RT | BL 3 h 40° C. | B 1 h | D hot | F 1 d |
| H 1 | A 14 | 243 | 247 | 233 | 259 | 283 | 253 | 356 |
| H 1 | A 15 | 270 | 223 | 235 | 256 | 285 | 276 | 471 |

It can be seen that the molds or cores produced according to the invention have similarly good flexural strengths.

We claim:
1. Mixture comprising:
   (I) one or more polyisocyanates with in each case two or more isocyanate groups in the molecule, and
   (II) a premixture prepared by reacting:
   (av) 1.0-50.0 wt % methanesulfonic acid;
   (bv) one or more esters of one or more phosphorous-oxygen acids, wherein the total quantity of said esters is in the range 5.0-90.0 wt %, and
   (cv) one or more silanes, selected from the group consisting of amino silanes, epoxy silanes, mercapto silanes and ureido silanes, wherein the total quantity of said silanes is in the range 5.0-90.0 wt %,
   wherein the proportion of water is a maximum of 0.1 wt %,
   wherein the wt % information relates to the total quantity of ingredients (av), (bv), (cv), and water in the premixture.

2. Mixture according to claim 1, wherein the total quantity of methanesulfonic acid in the mixture or premixture is in the range 3.0-40.0 wt %, with regard to the total quantity of ingredients (av), (bv) and (cv) in the premixture
and/or
the total quantity of the one or more esters of one or more phosphorous-oxygen acids in the mixture or premixture is in the range 10.0-80.0 wt %,-with regard to the total quantity of ingredients (av), (bv) and (cv) in the premixture
and/or
the total quantity of the one or more silanes in the mixture or premixture is in the range 10.0-85.0 wt %, with regard to the total quantity of ingredients (av), (bv) and (cv) in the premixture.

3. Mixture according to claim 1, wherein the total quantity of ingredients (av), (bv) and (cv) in the premixture is 90 wt % or more, with regard to the total quantity of the premixture.

4. Mixture according to claim 1, wherein the mass ratio of ingredient (av) to ingredient (bv) in the premixture is in the range 0.05-1.4, and/or
the mass ratio of ingredient (av) to ingredient (cv) in the premixture is in the range 0.03-1.6, and/or
the mass ratio of ingredient (bv) to ingredient (cv) in the premixture is in the range 0.1-4.0.

5. Mixture according to claim 1, wherein the or at least one of the ester(s) is of a phosphorous-oxygen acid, wherein the total quantity of said esters in the mixture or premixture is in the range 10.0-80.0 wt %,
and/or
wherein the or at least one of the silanes is selected from the group consisting of amino silanes, epoxy silanes, mercapto silanes and ureido silanes, wherein the total quantity of said silanes in the mixture or premixture is in the range 10.0-85.0 wt %,
wherein the wt % information in each case relates to the total quantity of ingredients (av), (bv) and (cv) in the premixture.

6. Mixture according to claim 1, comprising one or more solvents selected from the group consisting of
aromatic hydrocarbons;
fatty acid alkyl esters;
diesters of dicarboxylic acids;
propylene carbonate;
alkyl silicates,
wherein the total quantity of said solvent in the mixture in particular is in the range 0-80 wt %, with regard to the total quantity of the mixture.

7. A method of preparing a mixture comprising polyisocyanate component and/or polyol component of a two-component binding agent system for preparation of a polyurethane resin, comprising:
providing a mixture according to claim 1.

8. Mixture containing polyisocyanate according to claim 1 wherein:
(I) the one or more polyisocyanate is a methylene diphenyl diisocyanate or an oligomer or polymer thereof, and
(II) a total quantity of the premixture is 0.1-10.0 wt %, wherein the wt % information relates to the total quantity of solution containing polyisocyanate.

9. Mixture containing polyisocyanate according to claim 8, wherein
the total quantity of methanesulfonic acid in the solution containing polyisocyanate is in the range 0.003-4.000 wt %, with regard to the total quantity of solution containing polyisocyanate
and/or
the total quantity of the one or more esters of one or more phosphorous-oxygen acids in the solution containing polyisocyanate is in the range 0.01-8.0 wt %, with regard to the total quantity of solution containing polyisocyanate
and/or
the total quantity of the one or more silanes in the solution containing polyisocyanate is in the range 0.01-8.5 wt %, with regard to the total quantity of solution containing polyisocyanate.

10. Mixture containing polyisocyanate according to claim 8, comprising one or more solvents selected from the group consisting of
aromatic hydrocarbons;
fatty acid alkyl esters;
diesters of dicarboxylic acids;
propylene carbonate;
alkyl silicates,
wherein the total quantity of said solvent is in particular in the range 44.9-1 wt %, with regard to the total quantity of solution containing polyisocyanate.

11. Mixture containing polyisocyanate according to claim 8, comprising one or more solvents selected from the group of tetraalkyl silicates, wherein the total quantity of tetraalkyl silicates is in the range 44.9-1 wt %, with regard to the total quantity of solution containing polyisocyanate.

12. Mixture containing polyisocyanate according to claim 11, comprising tetraethyl-ortho silicate, wherein the total quantity of tetraethyl-ortho silicate is in the range 44.9-1wt%, with regard to the total quantity of solution containing polyisocyanate.

13. Mixture containing polyisocyanate according to claim 8, comprising a total quantity of polyisocyanate in the range 55-95 wt %, with regard to the total mass of the solution containing polyisocyanate.

14. Mixture containing polyisocyanate according to claim 8, comprising
acid chlorides in a maximum total quantity of 500 ppm (0.05 wt %)
and/or
chlorosilanes in a maximum total quantity of 500 ppm (0.05 wt %)
and/or
hydrofluoric acid in a maximum quantity of 500 ppm (0.05 wt %)
and/or
polyols in a maximum quantity of 500 ppm (0.05 wt %)
and/or
phenolic resins and furan resins with a maximum total quantity of 500 ppm (0.05 wt %), in each case with regard to the total quantity of solution containing polyisocyanate.

15. A method for preparing a foundry sand core or mold; a polyurethane resin; or a two-component binding agent system, comprising:
providing a mixture comprising polyisocyanate according to claim 8.

16. Two-component binding agent system for preparation of a polyurethane resin for casting, comprising:
a mixture containing polyisocyanate as defined in claim 8 as the polyisocyanate component,
and separately
a polyol component, wherein the polyol component in particular comprises a phenol-formaldehyde resin with two or more methylol groups per molecule.

17. A method for the preparation of foundry sand cores or molds
and/or
for production of a polyurethane resin, comprising,
mixing components of a two-component binding agent system according to claim 16; and
contacting the mixture with a gaseous catalyst to harden the mixture.

18. Mixture for production of a foundry core or mold, comprising a molding matrix
and either
the components of a two-component binding agent system, comprising, a solution containing polyisocyanate with two or more isocyanate groups in the molecule, wherein in particular the one polyisocyanate or at least one of the more polyisocyanates is a methylene diphenyl diisocyanate or an oligomer or polymer thereof, and,
separately, a polyol component, wherein the polyol component in particular comprises a phenol-formaldehyde resin with two or more methylol groups per molecule,
or
a polyisocyanate component and a polyol component of a two-component binding agent system and a mixture preparable by allowing the reaction of a premixture of
(av) 1.0-50.0 wt % methanesulfonic acid;
(bv) one or more esters of one or more phosphorous-oxygen acids, wherein the total quantity of said esters is in the range 5.0-90.0 wt %, and
(cv) one or more silanes, selected from the group consisting of amino silanes, epoxy silanes, mercapto silanes and ureido silanes, wherein the total quantity of said silanes is in the range 5.0-90.0 wt %,
wherein the proportion of water is a maximum of 0.1 wt %,
wherein the wt % information relates to the total quantity of ingredients (av), (bv), (cv), and water in the premixture.

19. Mold or core for casting,
comprising a molding matrix and the hardened binding agent system resulting from the hardening of a two-component binding agent system according to claim 16
or
producible by molding a mixture comprising a molding matrix and the components of a two-component binding agent system according to claim 16 and hardening of the binding agent system in the molded mixture to form a hardened binding agent system.

20. Method for production of a foundry core or mold, in particular according to the polyurethane-cold-box method, comprising:
mixing of a molding matrix with the components of a two-component binding agent system according to claim 16;
molding of the resultant mixture comprising molding matrix and the components of the binding agent system; and
bringing the resultant molded mixture into contact with a gaseous catalyst, in particular with a gaseous amine, so that the binding agent system hardens and binds the molding matrix.

21. The two-component binding agent system according to claim 16, wherein, with respect to the mixture containing polyisocyanate,
the total quantity of methanesulfonic acid in the solution containing polyisocyanate is in the range 0.003-4.000 wt %, with regard to the total quantity of solution containing polyisocyanate
and/or
the total quantity of the one or more esters of one or more phosphorous-oxygen acids in the solution containing polyisocyanate is in the range 0.01-8.0 wt %, with regard to the total quantity of solution containing polyisocyanate
and/or
the total quantity of the one or more silanes in the solution containing polyisocyanate is in the range 0.01-8.5 wt %, with regard to the total quantity of solution containing polyisocyanate.

* * * * *